United States Patent
Song (10) Patent No.: US 9,954,931 B2
(45) Date of Patent: Apr. 24, 2018

(54) APPARATUS AND METHOD FOR TRANSMITTING FILE USING A DIFFERENT TRANSMISSION SCHEME ACCORDING TO WHETHER THE FILE IS A FIRST TRANSMISSION FILE

(71) Applicant: SAMSUNG SDS CO., LTD., Seoul (KR)

(72) Inventor: Sung-Hak Song, Seongnam-Si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 261 days.

(21) Appl. No.: 14/918,884

(22) Filed: Oct. 21, 2015

(65) Prior Publication Data

US 2016/0119243 A1  Apr. 28, 2016

(30) Foreign Application Priority Data

Oct. 22, 2014 (KR) .................. 10-2014-0143470

(51) Int. Cl.
*G06F 15/16* (2006.01)
*H04L 29/08* (2006.01)
*H04L 12/805* (2013.01)

(52) U.S. Cl.
CPC ............ *H04L 67/06* (2013.01); *H04L 47/365* (2013.01)

(58) Field of Classification Search
CPC .............................. H04L 47/365; H04L 67/06
See application file for complete search history.

(56) References Cited

U.S. PATENT DOCUMENTS

| | | | |
|---|---|---|---|
| 2010/0124239 A1* | 5/2010 | Hughes | H04L 69/04 370/477 |
| 2013/0159547 A1* | 6/2013 | Miyao | H04N 21/222 709/233 |
| 2013/0290422 A1* | 10/2013 | Kumagai | H04L 65/403 709/204 |
| 2013/0311739 A1* | 11/2013 | Kawakami | G06F 3/0608 711/165 |
| 2016/0050155 A1* | 2/2016 | Liu | H04L 47/286 370/235 |

\* cited by examiner

*Primary Examiner* — Mohamed A Wasel
(74) *Attorney, Agent, or Firm* — Sughrue Mion, PLLC (57) ABSTRACT

A file transmission apparatus is proposed for increasing transmission speed of files, wherein the apparatus determines whether a transmission target file is a first transmission file prior to transmission of the transmission target file and transmits the transmission target file using a different transmission scheme according to a result of the determination.

15 Claims, 5 Drawing Sheets

APPARATUS AND METHOD FOR TRANSMITTING FILE USING A DIFFERENT TRANSMISSION SCHEME ACCORDING TO WHETHER THE FILE IS A FIRST TRANSMISSION FILE

CROSS-REFERENCE TO RELATED APPLICATION

This application claims priority to and the benefit of Korean Patent Application No. 10-2014-0143470, filed on Oct. 22, 2014, the disclosure of which is incorporated herein by reference in its entirety.

BACKGROUND

1. Field

The present disclosure relates to technology for increasing transmission speed of files.

2. Discussion of Related Art

Conventionally, a deduplication transmission scheme has been used for data reduction in file transmission. The deduplication transmission scheme refers to a scheme for reducing a portion duplicated in both of a transmission target file and a previously transmitted file and transmitting the resultant transmission target file when the previously transmitted file is retransmitted. However, in this deduplication transmission scheme, when the previously transmitted file or a file including a large portion duplicated from the previously transmitted file is retransmitted, only a great effect of improvement of transmission speed appears. In this deduplication transmission scheme, when a new file different from the previously transmitted file (or a file including a small duplicate portion) is transmitted, the effect of improvement of transmission speed hardly appears.

SUMMARY

One or more exemplary embodiments provide an apparatus and a method capable of improving transmission speed of files.

According to an aspect of an exemplary embodiment, there is provided a file transmission apparatus, including at least one hardware processor to implement: a determiner configured to determine whether a transmission target file is a first transmission file; and a transmitter configured to divide the transmission target file into a plurality of packets and transmit the plurality of packets to a file reception apparatus, wherein the transmitter is configured to transmit the transmission target file in which a duplicate portion between the transmission target file and a previously transmitted file is reduced, when it is determined that the transmission target file is not the first transmission file, and transmit the transmission target file without reducing the transmission target file when it is determined that the transmission target file is the first transmission file, wherein a transmission speed of the plurality of packets is increased by increasing an amount of the plurality of packets to be input to a buffer of a router while not exceeding a size of the buffer of the router.

The determiner may be configured to generate meta-information of the transmission target file, and compare the meta-information of the transmission target file with pre-stored meta-information to determine whether the transmission target file is the first transmission file.

The determiner may be configured to generate the meta-information of the transmission target file based on a name and a size of the transmission target file.

The determiner may be configured to respectively compare first characters included in the meta-information of the transmission target file with second characters included in the pre-stored meta-information, and determine that the transmission target file is the first transmission file when a number of matches between the first characters and the second characters is equal to or smaller than a preset value.

The determiner may be configured to sample and hash a portion of the transmission target file to acquire a hash value, and determine that the transmission target file is the first transmission file based on the hash value.

When it is determined that the transmission target file is not the first transmission file, the transmitter may be configured to transmit an index corresponding to the duplicate portion between the transmission target file and the previously transmitted file, instead of transmitting the duplicate portion.

When a currently available bandwidth of a network is equal to or greater than a preset value, the transmitter may be configured to transmit the transmission target file in which the duplicate portion between the transmission target file and the previously transmitted file is reduced, wherein the transmission speed of the plurality of packets is increased by increasing the amount of the plurality of packets to be input to the buffer of the router while not exceeding the size of the buffer of the router.

According to an aspect of another exemplary embodiment, there is provided a file transmission method, including: determining whether a transmission target file is a first transmission file; and dividing the transmission target file into a plurality of packets and transmitting the plurality of packets to a file reception apparatus, wherein the transmitting includes: transmitting the transmission target file in which a duplicate portion between the transmission target file and a previously transmitted file is reduced, when it is determined that the transmission target file is not the first transmission file, and transmitting the transmission target file without reducing the transmission target file when it is determined that the transmission target file is the first transmission file, wherein a transmission speed of the plurality of packets is increased by increasing an amount of the plurality of packets to be input to a buffer of a router while not exceeding a size of the buffer of the router, wherein at least one of the transmitting and the dividing is performed by using at least one hardware processor.

The determining may include generating meta-information of the transmission target file; and comparing the meta-information of the transmission target file with pre-stored meta-information to determine whether the transmission target file is the first transmission file.

The generating may include generating the meta-information of the transmission target file based on a name and a size of the transmission target file.

The comparing may include respectively comparing first characters included in the meta-information of the transmission target file with second characters included in the pre-stored meta-information; and determining that the transmission target file is the first transmission file when a number of matches between the first characters and the second characters is equal to or smaller than a preset value.

The determining may include sampling and hashing a portion of the transmission target file to acquire a hash value; and determining that the transmission target file is the first transmission file based on the hash value.

The transmitting the plurality of packets may include transmitting an index corresponding to the duplicate portion between the transmission target file and the previously transmitted file, instead of transmitting the duplicate portion, when it is determined that the transmission target file is not the first transmission file.

The transmitting the plurality of packets may include: when a currently available bandwidth of a network is equal to or greater than a preset value, transmitting the transmission target file in which the duplicate portion between the transmission target file and the previously transmitted file is reduced, wherein the transmission speed of the plurality of packets is increased by increasing the amount of the plurality of packets to be input to the buffer of the router while not exceeding the size of the buffer of the router.

According to an aspect of still another exemplary embodiment, there is provided a non-transitory computer-readable recording medium storing a computer program which, when executed by a computer, causes the computer to execute: determining whether a transmission target file is a first transmission file; and dividing the transmission target file into a plurality of packets and transmitting the plurality of packets to a file reception apparatus, wherein the transmitting includes: transmitting the transmission target file in which a duplicate portion between the transmission target file and a previously transmitted file is reduced, when it is determined that the transmission target file is not the first transmission file; and transmitting the transmission target file without reducing the transmission target file when it is determined that the transmission target file is the first transmission file, wherein a transmission speed of the plurality of packets is increased by increasing an amount of the plurality of packets to be input to a buffer of a router while not exceeding a size of the buffer of the router.

According to exemplary embodiments of the present disclosure, it is possible to efficiently transmit a file by determining whether a transmission target file is a first transmission file prior to transmission of the file and using a different transmission scheme according to a result of the determination. In particular, when a file is first transmitted, it is possible to solve a problem of speed degradation according to the first transmission by using a UDP-based optimal transmission scheme, and it is possible to reduce transmission data by using a deduplication transmission scheme when a previously transmitted file is retransmitted.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

The present disclosure can be variously modified and have several exemplary embodiments. Specific exemplary embodiments will be illustrated in the drawings and described in detail through detailed description. However, this is not intended to limit the present disclosure to the specific exemplary embodiments, and it should be understood that all modifications, equivalents or alternatives within the spirit and scope of the disclosure are included.

If it is decided that specific description of known art related to the present disclosure may unnecessarily obscure the gist of the present disclosure in describing the present disclosure, the detailed description will be omitted. Terms to be described below are terms defined in consideration of functions in the present disclosure, and may vary according to intention or practice of a user or an operator. Therefore, the definition will determined based on content throughout the specification.

The spirit of the present disclosure is determined by the claims, and the following exemplary embodiments are only means for efficiently describing the spirit of the present disclosure to those skilled in the art to which the present disclosure pertains.

Hereinafter, specific exemplary embodiments of the present disclosure will be described with reference to the drawings. However, these are merely exemplary embodiments, and the present disclosure is not limited thereto.

Figure 1:
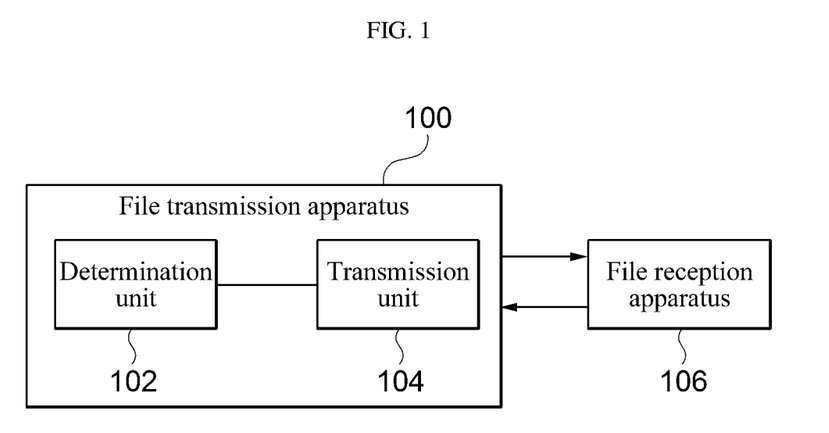
FIG. 1 is a block diagram illustrating a file transmission apparatus according to an exemplary embodiment of the present disclosure.

FIG. 1 is a block diagram illustrating a file transmission apparatus 100 according to an exemplary embodiment of the present disclosure. The file transmission apparatus 100 according to an exemplary embodiment of the present disclosure is intended to increase a transmission speed of a file to be transmitted to a file reception apparatus 106, and particularly to improve a transmission speed of the file in a process of first transmitting the file. As illustrated in FIG. 1, the file transmission apparatus 100 includes a determination unit (or determiner) 102, and a transmission unit (or transmitter) 104.

The determination unit 102 determines whether or not a file to be transmitted by the file transmission apparatus 100, that is, a transmission target file is a first transmission file. Here, the first transmission file is a file that has not been previously transmitted by the file transmission apparatus 100, and refers to a file that does not have a portion duplicated from a previously transmitted file or that has a duplicate portion below a preset percentage.

The determination unit 102 may generate meta-information of the transmission target file and store the meta-information. Before storing the generated meta-information, the determination unit 102 may compare the generated meta-information with the pre-stored meta-information to determine whether or not the transmission target file is a first transmission file. The meta-information is structured data regarding the transmission target file, and is used to determine whether or not the transmission target file is a first transmission file. The determination unit 102 may generate the meta-information using, for example, a name, a size, or the like of the transmission target file. For example, the determination unit 102 may combine the name of the transmission target file with the size of the transmission target file to generate the meta-information of the transmission target file. Thereafter, the determination unit 102 may sequentially compare respective characters included in the meta-information of the transmission target file with respective characters included in the pre-stored meta-information, and determine that the transmission target file is a first transmission file when the number of times the characters match is zero or equal to or smaller than a preset value. Thereafter, the determination unit 102 may store the generated meta-information, and this stored meta-information may be used to determine whether or not a transmission target file in the transmission unit 104 is a first transmission file at a subsequent time. This will be described below in detail with reference to FIGS. 2 and 3.

Further, the determination unit 102 may sample and hash a portion of the transmission target file to acquire and store a hash value. Here, before storing the acquired hash value, the determination unit 102 may confirm whether or not the same value as the acquired hash value is pre-stored, and secondarily determine whether or not the transmission target file is a first transmission file. The determination unit 102 can minimize the time taken for hashing and searching of the entire file by sampling and hashing only a portion of the file and can rapidly and accurately determine whether or not the transmission target file is a first transmission file by confirming whether or not the same value as the acquired hash value is pre-stored. For example, the determination unit 102 may determine that the transmission target file is a previously transmitted file when the same value as the acquired hash value is pre-stored, and determine that the transmission target file is a first transmission file when the same value as the acquired hash value is not pre-stored. Thereafter, the determination unit 102 may store the acquired hash value, and this stored hash value may be used to determine whether or not a transmission target file in the transmission unit 104 is a first transmission file at a subsequent time. This will be described below in detail with reference to FIGS. 2 and 4.

The transmission unit 104 transmits the transmission target file to the file reception apparatus 106 using a different transmission scheme according to a result of the determination in the determination unit 102. The transmission unit 104 may divide the transmission target file into a plurality of packets and transmit the packets to the file reception apparatus 106. If the determination unit 102 determines that the transmission target file is not the first transmission file, the transmission unit 104 may transmit the transmission target file to the file reception apparatus 106 using the deduplication transmission scheme. If the determination unit 102 determines that the transmission target file is the first transmission file, the transmission unit 104 may transmit the transmission target file to the file reception apparatus 106 using the UDP-based optimal transmission (UDP Transport Optimization) scheme.

The deduplication transmission scheme refers to a scheme for reducing a portion duplicated in both a transmission target file and a previously transmitted file at the time of file transmission, and transmitting the resultant transmission target file. According to the deduplication transmission scheme, when a file is first transmitted, the file may be chunked, an index may be set for each chunk, and then, the chunks and indexes for the respective chunks may be transmitted. When a previously transmitted file is retransmitted, only a previous set index may be transmitted for the chunk duplicated between the transmission target file and the previously transmitted file. Here, the index can include characters, numbers, or a combination thereof. However, in the deduplication transmission scheme, when a previously transmitted file or a file having a large portion duplicated from the previously transmitted file is retransmitted, a great effect of improvement of the transmission speed appears, and when a new file different from the previously transmitted file (or a file having a small duplicate portion) is transmitted, the effect of improvement of the transmission speed hardly appears. Thus, in an exemplary embodiment of the present disclosure, the transmission unit 104 can transmit the file using a different transmission scheme according to the determination result of the determination unit 102. If the determination unit 102 determines that the transmission target file is a first transmission file, the transmission unit 104 may directly generate a packet for transmission without a process of converting a portion (chunk) duplicated from the previously transmitted file into an index, and transmit the packet to the file reception apparatus 106 using the UDP-based optimal transmission scheme.

The UDP-based optimal transmission (UDP Transport Optimization) scheme refers to a scheme for transmitting a transmission target file as it is, without reducing the transmission target file, in which the transmission target file is transmitted so that the transmission speed of the packet is maximized in a range in which an amount of packets input to a buffer of a router (not illustrated) does not exceed a size of the buffer of the router. The transmission speed of the packet refers to an amount of packets transmitted from the file transmission apparatus 100 to the file reception apparatus 106 during a preset time. The router is a device that relays a network to which the file transmission apparatus 100 belongs and a network to which the file reception apparatus 106 belongs. UDP traffic transmitted by the file transmission apparatus 100 passes through the router. According to the UDP-based optimal transmission, a transmission speed of a packet transmitted from a transmission buffer of the file transmission apparatus 100 can be controlled by setting at least a portion of the entire buffer (or entire queue) of the router as a target buffer (or target queue) and adjusting an amount of packets input to the target buffer of the router. For example, when one-tenth of the entire buffer of the router is used as the target buffer, if the amount of packets input to the target buffer exceeds a preset threshold value, the amount of packets input from the transmission buffer of the file transmission apparatus 100 to the target buffer of the router can be decreased, and if the amount of packets input to the target buffer of the router does not exceed the preset threshold value, the amount of packets input from the transmission buffer of the file transmission apparatus 100 to the target buffer of the router can be increased. In an example, by inserting an inter-packet delay time between packets to be transmitted, the amount of packets transmitted to the router can be adjusted. That is, according to the UDP-based optimal transmission, it is possible to maximize the transmission speed of the packet by increasing the amount of packets to be input to the buffer of the router to the threshold value in a range in which the amount of packets to be input to the buffer of the router does not exceed the threshold value. Accordingly, it is possible to control congestion according to a queuing delay and increase the transmission speed of the overall transmission target file.

Meanwhile, the file reception apparatus 106 is an apparatus that receives the file transmitted by the file transmission apparatus 100. The file reception apparatus 106 may receive the entire file and the entire index transmitted through the UDP-based optimal transmission scheme or a portion of the file and a portion of the index transmitted through the deduplication transmission scheme from the file transmission apparatus 100, and store the file and the index. In this case, the file reception apparatus 106 may decode the index transmitted through the deduplication transmission scheme into an original file by referring to a pre-stored file and a pre-stored index. Moreover, as will be described below, the file reception apparatus 106 may transmit information used to estimate a currently available bandwidth of the network, that is, reception rate information of the data delivered from the file transmission apparatus 100, to the file transmission apparatus 100. The file transmission apparatus 100 may acquire a current estimated capacity of the network, and calculate a currently available bandwidth of the network based on the data reception rate information received from the file reception apparatus 106. If the currently available bandwidth of the network is equal to or greater than a preset value, the file transmission apparatus 100 may transmit the transmission target file to the file reception apparatus 106 using both of the deduplication transmission scheme and the UDP-based optimal transmission scheme described above. Thus, it is possible to simultaneously achieve a data reduction effect of the deduplication transmission scheme and the high-speed transmission effect of the UDP-based optimal transmission scheme.

Figure 2:
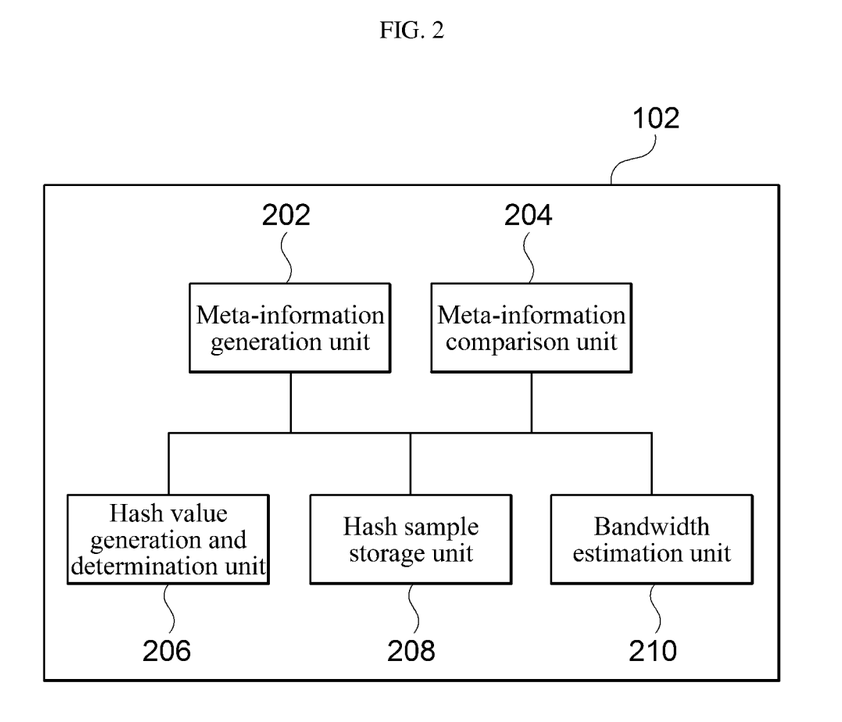
FIG. 2 is a block diagram illustrating a detailed configuration of a determination unit according to an exemplary embodiment of the present disclosure.

FIG. 2 is a block diagram illustrating a detailed configuration of the determination unit 102 according to an exemplary embodiment of the present disclosure. As illustrated in FIG. 2, the determination unit 102 includes a meta-information generation unit 202, a meta-information comparison unit 204, a hash value generation and determination unit 206, a hash sample storage unit 208, and a bandwidth estimation unit 210.

The meta-information generation unit 202 generates meta-information of the transmission target file in the transmission unit 104. As described above, the meta-information is structured data regarding the transmission target file, and is used to determine whether or not the transmission target file is a first transmission file.

In an example, the meta-information generation unit 202 may combine a name (for example, a file name: travel photo) of the transmission target file with a size (for example, file size: 1 MB) of the transmission target file to generate the meta-information (for example, "travel photo 1 MB") of the transmission target file. In this case, the meta-information generation unit 202 may convert "the name of transmission target file+the size of the transmission target file" to have a character string form using a base 64 encoding scheme. Base 64 is an encoding scheme for converting binary data to an ASCII text or vice versa. In the case of the file name, a special character (for example, a space character or the like) may be included or a character form may be different among countries. Accordingly, in an exemplary embodiment of the present disclosure, "the name of transmission target file+the size of the transmission target file" is converted into a common ASCII text using the base 64 encoding scheme, such that comparison of respective characters included in the meta-information can be facilitated regardless of special characters and a character form of each country.

The meta-information comparison unit 204 compares the meta-information generated by the meta-information generation unit 202 with pre-stored meta-information. If the transmission unit 104 transmits a file to the file reception apparatus 106, the meta-information of the transmitted file may be stored in an internal database (not shown). The meta-information comparison unit 204 may compare the meta-information generated by the meta-information generation unit 202 with the meta-information stored in the database, and primarily determine whether or not the transmission target file in the transmission unit 104 is a first transmission file. This will be described in detail with reference to FIG. 3.

Figure 3:
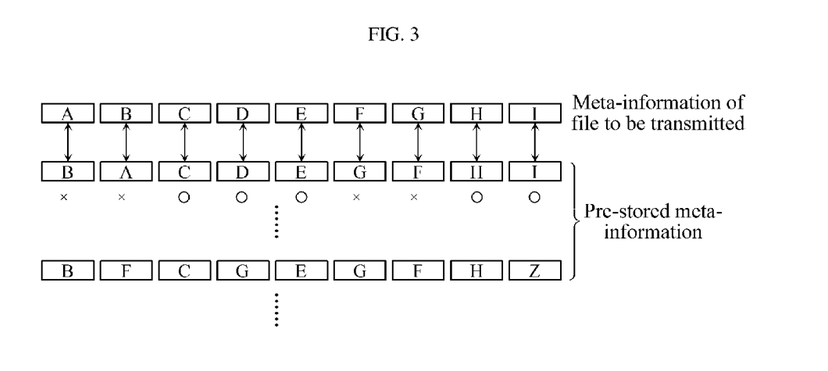
FIG. 3 is a diagram illustrating a process of determining whether a transmission target file is a first transmission file based on meta-information according to an exemplary embodiment of the present disclosure.

FIG. 3 is a diagram illustrating a process of determining whether or not the transmission target file is a first transmission file based on the meta-information according to an exemplary embodiment of the present disclosure. FIG. 3 represents an example of the meta-information of the transmission target file, and an example of pre-stored meta-information. As illustrated in FIG. 3, the meta-information may be configured in a form in which a plurality of characters (or numbers) are listed.

The meta-information comparison unit 204 may compare each character included in the meta-information of the transmission target file with each character included in pre-stored meta-information. For example, the meta-information comparison unit 204 may compare each of the characters A, B, C, D, E, F, G, H, and I included in the meta-information of the transmission target file with each of characters B, A, C, D, E, G, F, H, and I included in the meta-information of the transmitted file. In this case, the third character C, the fourth character D, the fifth character E, the eighth character H, and the ninth character I match. When a name or a size of the file is changed, a type or an order of the characters included in the meta-information is changed. Therefore, the meta-information comparison unit 204 may sequentially compare the respective characters included in the meta-information of the transmission target file with the respective characters included in the pre-stored meta-information.

When the number of times that the respective characters included in the meta-information of the transmission target file match the respective characters included in the presorted meta-information is zero or equal to or smaller than a preset value (for example, three times), the meta-information comparison unit 204 may determine that the transmission target file is a first transmission file. When the transmission target file is a previously transmitted file, a probability of the characters included in the meta-information matching each other increases, and the meta-information comparison unit 204 can quickly determine whether or not the transmission target file is a first transmission file through the comparison of the characters included in the meta-information.

Returning to FIG. 2, the hash value generation and determination unit 206 may secondarily determine whether or not the transmission target file is a first transmission file using the hash value of the transmission target file. As described above, the meta-information comparison unit 204 may compare the meta-information of the transmission target file with the pre-stored meta-information and primarily determine whether or not the transmission target file is a first transmission file. When the above-described scheme of comparing the meta-information is used, it is possible to quickly determine whether or not the transmission target file is the same as a previously transmitted file, but according to this method, even when only the name of the previously transmitted file is changed, the transmission target file is likely to be determined to be a new file. Thus, in the exemplary embodiments of the present disclosure, it may be secondarily determined whether or not the transmission target file is a first transmission file using the hash value of the transmission target file.

The hash value generation and determination unit 206 may sample and hash a portion of the transmission target file to acquire the hash value. For example, the hash value generation and determination unit 206 may extract and hash a first portion 0.5%, an intermediate portion 0.5%, and a final portion 0.5% of the transmission target file. The hash value generation and determination unit 206 may sample and hash only a portion of the file to minimize time according to hashing and searching of the entire file. In an example, the hash value generation and determination unit 206 can hash a portion of the file using a rolling hash scheme. Examples of the rolling hash scheme may be a Rabin-Karp rolling hash algorithm, and an rsync program.

The hash value generation and determination unit 206 may confirm whether or not the generated hash value is pre-stored in the hash sample storage unit 208 to secondarily determine whether or not the transmission target file is a first transmission file. For example, when the generated hash value is pre-stored in the hash sample storage unit 208, the hash value generation and determination unit 206 may determine that the transmission target file is a previously transmitted file, and when the generated hash value is not pre-stored in the hash sample storage unit 208, the hash value generation and determination unit 206 may determine that the transmission target file is a first transmission file.

The hash sample storage unit 208 stores the hash value generated by the hash value generation and determination unit 206. After the hash value generation and determination unit 206 determines whether or not the transmission target file is a first transmission file based on the hash value, the hash sample storage unit 208 may store the hash value. The hash value stored in the hash sample storage unit 208 may be used to determine whether or not the transmission target file in the transmission unit 104 is a first transmission file at a subsequent time.

The bandwidth estimation unit 210 estimates a currently available bandwidth of the network. First, the bandwidth estimation unit 210 can acquire the current estimated capacity of the network using, for example, a packet-pair scheme. Then, the bandwidth estimation unit 210 can calculate the currently available bandwidth of the network based on the acquired current estimated capacity of the network. As described above, the file reception apparatus 106 can transmit data reception rate information delivered from the transmission unit 104, to the bandwidth estimation unit 210. Here, the data reception rate (or the reception speed) refers to an amount of data delivered from the transmission unit 104 to the file reception apparatus 106 during a unit time. The bandwidth estimation unit 210 may calculate a difference between the current estimated capacity of the network and the data reception rate, and determine the currently available bandwidth of the network.

If the currently available bandwidth of the network is equal to or greater than a preset value (for example, if a ratio of the currently available bandwidth of the network to the current estimated capacity is 30% or more), the transmission unit 104 may transmit the transmission target file to the file reception apparatus 106 using both of the deduplication transmission scheme and the UDP-based optimal transmission scheme described above. That is, the transmission unit 104 may determine a current use rate of the network, reduce a portion duplicated in both the transmission target file and the previously transmitted file when the current use rate of the network is not high, and transmit the resultant transmission target file, in which the transmission unit 104 may transmit the transmission target file so that the transmission speed of the packets is maximized in a range in which an amount of packets to be input to the buffer of the router does not exceed a size of the buffer of the router. Accordingly, it is possible to simultaneously achieve a data reduction effect of the deduplication transmission scheme and high-speed transmission effect of the UDP-based optimal transmission scheme, and increase the efficiency of network usage.

Figure 4:
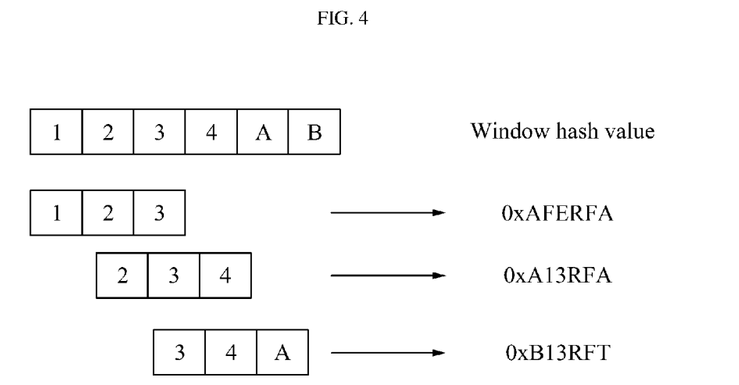
FIG. 4 is a diagram illustrating an example of a hash value according to an exemplary embodiment of the present disclosure.

FIG. 4 is a diagram illustrating an example of a hash value according to an exemplary embodiment of the present disclosure. As illustrated in FIG. 4, the hash value generation and determination unit 206 may generate a window hash value for a portion of the transmission target file using a rolling hash scheme. For example, when it is assumed that the transmission target file includes 1, 2, 3, 4, A, and B, the window hash value for 1, 2 and 3 may be 0xAFERFA, the window hash value for 2, 3, and 4 may be 0xA13RFA, and the window hash value for 3, 4, and A may be 0xB13RFT.

As described above, the hash value generation and determination unit 206 may secondarily determine whether or not the transmission target file is a first transmission file based on the hash value of the transmission target file. For example, when the meta-information of the transmission target file does not match the pre-stored meta-information, and the hash value for a portion of the transmission target file is not pre-stored in the hash sample storage unit 208, the determination unit 102 may determine that the transmission target file is a first transmission file.

Figure 5:
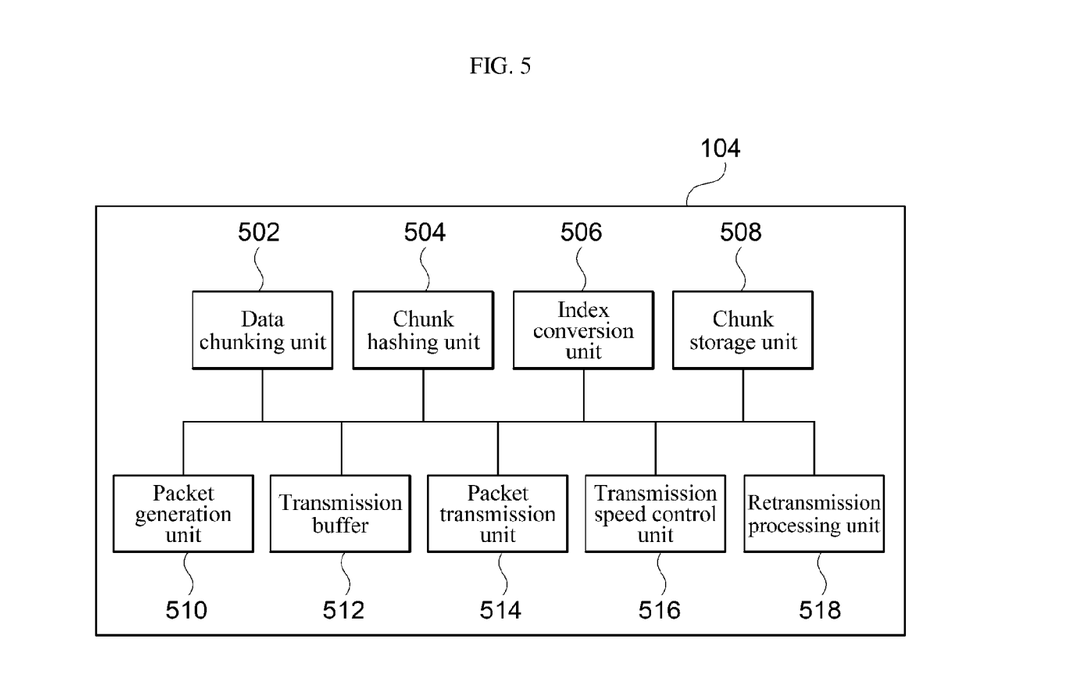
FIG. 5 is a block diagram illustrating a detailed configuration of a transmission unit according to an exemplary embodiment of the present disclosure.

FIG. 5 is a block diagram illustrating a detailed configuration of the transmission unit 104 according to an exemplary embodiment of the present disclosure. As illustrated in FIG. 5, the transmission unit 104 includes a data chunking unit 502, a chunk hashing unit 504, an index conversion unit 506, a chunk storage unit 508, a packet generation unit 510, a transmission buffer 512, a packet transmission unit 514, a transmission speed control unit 516, and a retransmission processing unit 518.

The data chunking unit 502 chunks data having a form duplicated from the previously transmitted file among items of data in a block form read from the transmission target file. The data chunking unit 502 may perform variable size chunking on the transmission target file according to a size of the portion duplicated in both the transmission target file and the previously transmitted file.

The chunk hashing unit 504 hashes the chunk cut by the data chunking unit 502. The chunk hashing unit 504 may hash the chunk cut by the data chunking unit 502, for example, using an SHA-1, SHA-256, or SHA-384 algorithm. The chunk hashing unit 504 may set an index for each hashed chunk, and then, store the hashed chunks and the indexes for the respective hashed chunks in the chunk storage unit 508. Here, the index may include one or more characters, one or more numbers, or a combination thereof. If the determination unit 102 determines that the transmission target file is a first transmission file, the chunk hashing unit 504 may immediately transmit the hashed chunks and the indexes for the respective hashed chunks to the packet generation unit 510.

The index conversion unit 506 performs deduplication of the transmission target file. If the determination unit 102 determines that the transmission target file is not the first transmission file, the index conversion unit 506 may confirm whether or not the same chunk as the chunk hashed by the chunk hashing unit 504 is pre-stored in the chunk storage unit 508. In an example, before the chunk hashing unit 504 stores the hashed chunk in the chunk storage unit 508, the index conversion unit 506 may receive the hashed chunk from the chunk hashing unit 504, and transmit an inquiry request message for the chunk to the chunk storage unit 508. If the same chunk as the chunk hashed by the chunk hashing unit 504 is stored in the chunk storage unit 508, the index conversion unit 506 may transmit the index of the chunk rather than the chunk to the packet generation unit 510. That is, according to an exemplary embodiment of the present disclosure, if there is a portion duplicated in both the transmission target file and the previously transmitted file, only the index for the duplicate portion may be transmitted to the file reception apparatus 106.

The chunk storage unit 508 stores the chunks hashed by the chunk hashing unit 504, and the index for each hashed chunk. As described above, the chunk storage unit 508 may receive the inquiry request message regarding whether or not the chunk is pre-stored from the index conversion unit 506. If the same chunk as the chunk inquired about by the index conversion unit 506 is pre-stored in the chunk storage unit 508, the chunk storage unit 508 may transmit the index for the chunk to the index conversion unit 506.

The packet generation unit 510 divides the transmission target file into a plurality of packets. As described above, the packet generation unit 510 may receive the hashed chunks and the index for each hashed chunk from the chunk hashing unit 504, or may receive the index for the portion duplicated from the previously transmitted file from the index conversion unit 506. The packet generation unit 510 may generate a plurality of packets based on the data received from the chunk hashing unit 504 or the index conversion unit 506. The packet generated by the packet generation unit 510 may include a packet header, and a packet payload.

The transmission buffer 512 temporarily store the packets generated by the packet generation unit 510. Thereafter, the transmission buffer 512 may sequentially transmit the packets to the file reception apparatus 106 via the packet transmission unit 514. The packets transmitted by the packet transmission unit 514 may be sent to the file reception apparatus 106 through the buffer of the router. As described above, according to the UDP-based optimal transmission, an amount of packets to be input to the buffer of the router may increase to a preset threshold value within a range in which the amount does not exceed the size of the buffer of the router. Accordingly, a transmission speed of the packets in the file transmission apparatus 100 can be maximized.

The packet transmission unit 514 transmits the packets stored in the transmission buffer 512 to the file reception apparatus 106. The transmission speed of the packets transmitted by the packet transmission unit 514 may vary depending on the transmission speed of the packets transmitted by the transmission buffer 512. That is, when the transmission speed of the packet transmitted by the transmission buffer 512 increases, the packet transmission speed of the packet transmitted by the packet transmission unit 514 increases, and when the transmission speed of the packet transmitted by the transmission buffer 512 decreases, the transmission speed of the packet transmitted by the packet transmission unit 514 decreases.

The transmission speed control unit 516 controls the packet transmission speed in the transmission buffer 512 or the packet transmission unit 514. In an example, the transmission speed control unit 516 may insert an inter-packet delay time between the packets to be transmitted by the transmission buffer 512 or the packet transmission unit 514 to adjust an amount of packets to be transmitted to the router. Thus, the transmission speed of packets may be controlled. The transmission speed control unit 516 may receive network queuing delay information from the file reception apparatus 106, and adjust the amount of packets to be input to the buffer of the router based on the network queuing delay information. Thus, it is possible to efficiently perform the UDP-based optimal transmission described above.

The retransmission processing unit 518 transmits the packet for retransmission to the transmission buffer 512 based on packet loss information received from the file reception apparatus 106 in UDP-based acceleration transmission. As will be described below, the file reception apparatus 106 may determine whether or not the packet is lost in a data stream delivered from the packet transmission unit 514, generate a lost packet retransmission message for a retransmission request, and transmit the lost packet retransmission message to the retransmission processing unit 518.

Figure 6:
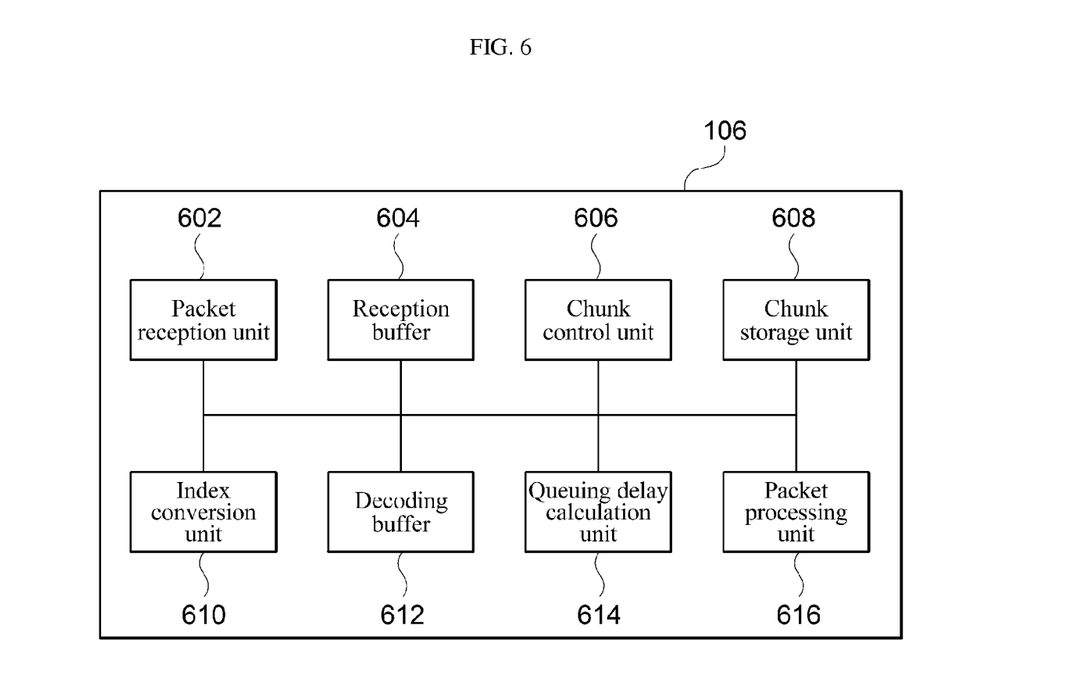
FIG. 6 is a block diagram illustrating a detailed configuration of a file reception apparatus according to an exemplary embodiment of the present disclosure.

FIG. 6 is a block diagram illustrating a detailed configuration of the file reception apparatus 106 according to an exemplary embodiment of the present disclosure. As illustrated in FIG. 6, the file reception apparatus 106 includes a packet reception unit 602, a reception buffer 604, a chunk control unit 606, a chunk storage unit 608, an index conversion unit 610, a decoding buffer 612, a queuing delay calculation unit 614, and a packet processing unit 616.

The packet reception unit 602 receives the packet from the packet transmission unit 514. Here, the packet may relate to an entire file and an entire index transmitted according to the UDP-based optimal transmission scheme or a portion of the file and a portion of the index transmitted through the deduplication transmission scheme.

The reception buffer 604 temporarily stores the packet received via the packet reception unit 602.

The chunk control unit 606 may store the packet stored in the reception buffer 604 in the chunk storage unit 608, or may transmit the inquiry request message for the packet stored in the reception buffer 604 to the chunk storage unit 608.

If the file received via the packet reception unit 602 is a new file (that is, the file is not a previously transmitted file), the chunk control unit 606 may store the chunks and indexes for the respective chunks stored in the reception buffer 604 in the chunk storage unit 608.

If the file received via the packet reception unit 602 is a new file (that is, the file is not a previously transmitted file), the chunk control unit 606 may transmit an inquiry request message for the packet stored in the reception buffer 604 to the chunk storage unit 608.

The chunk storage unit 608 receives the packets stored in the reception buffer 604 from the chunk control unit 606 and stores the packets. Further, the chunk storage unit 608 may receive the inquiry request message for the packets stored in the reception buffer 604 from the chunk control unit 606. In this case, the chunk storage unit 608 may transmit the index included in the packet to the index conversion unit 610.

The index conversion unit 610 receives the index from the chunk storage unit 608, and decodes the received index into an original file. The index conversion unit 610 may confirm whether or not the same index as the received index is pre-stored in the chunk storage unit 608, and restore a chunk duplicated from the previously transmitted file.

The decoding buffer 612 stores the data decoded by the index conversion unit 610. The index conversion unit 610 may decode the index received from the chunk storage unit 608 into the original file, and transmit the original file to the decoding buffer 612.

The queuing delay calculation unit 614 calculates a queuing delay in the network based on round trip time (RTT), and transmits the calculated queuing delay information to the transmission speed control unit 516. As described above, the transmission speed control unit 516 may control the packet transmission speed of the transmission buffer 512 or the packet transmission unit 514 according to the queuing delay information received from the queuing delay calculation unit 614, and accordingly, efficiently performs the UDP-based optimal transmission described above.

Further, the queuing delay calculation unit 614 may calculate the amount of data delivered from the transmission unit 104 during the unit time and generate data reception rate information transmitted from the transmission unit 104. As described above, the bandwidth estimation unit 210 may receive the data reception rate information described above from the queuing delay calculation unit 614, calculate a difference between the current estimated capacity of the network and the data reception rate, and determine the currently available bandwidth of the network.

The packet processing unit 616 determines whether or not the packet is lost in the data stream transmitted from the file transmission apparatus 100, generates a lost packet retransmission message for a retransmission request, and then, transmits the lost packet retransmission message to the retransmission processing unit 518. The packet processing unit 616 may determine, for example, whether or not the packet is lost using a sequence number according to data transmission and reception between the file transmission apparatus 100 and the file reception apparatus 106. In an example, if a sequence number of a previous file data block is not received by referring to a last sequence number of a file data block received by the file reception apparatus 106, the packet processing unit 616 may determine that a file for a sequence of the previous file data block has been lost. Further, the packet processing unit 616 may determine that the packet is lost when there is no response between the file transmission apparatus 100 and the file reception apparatus 106 during a preset time. As described above, the retransmission processing unit 518 may transmit a packet for retransmission to the transmission buffer 512 based on the packet loss information received from the packet processing unit 616 in the UDP-based optimal transmission. Accordingly, it is possible to improve the reliability of file transmission as compared to a general UDP transmission scheme.

The above modules of the file transmission apparatus 100 and the file reception apparatus 106 may be implemented with hardware. For example, the file transmission apparatus 100 and the file reception apparatus 106 may be implemented or included in a computing apparatus. The computing apparatus may include at least one processor and a computer-readable storage medium such as a memory that is accessible by the processor. The computer-readable storage medium may be disposed inside or outside the processor, and may be connected with the processor using well known means. A computer executable instruction for controlling the computing apparatus may be stored in the computer-readable storage medium. The processor may execute an instruction stored in the computer-readable storage medium. When the instruction is executed by the processor, the instruction may allow the processor to perform an operation according to an example embodiment. In addition, the computing apparatus may further include an interface device configured to support input/output and/or communication between the computing apparatus and at least one external device, and may be connected with an external device (for example, a device in which a system that provides a service or solution and records log data regarding a system connection is implemented). Furthermore, the computing apparatus may further include various different components (for example, an input device and/or an output device), and the interface device may provide an interface for the components. Examples of the input device include a pointing device such as a mouse, a keyboard, a touch sensing input device, and a voice input device, such as a microphone. Examples of the output device include a display device, a printer, a speaker, and/or a network card. Thus, the determination unit 102 and the transmission unit 104 of the file transmission apparatus 100 may be implemented as hardware of the above-described computing apparatus.

Figure 7:
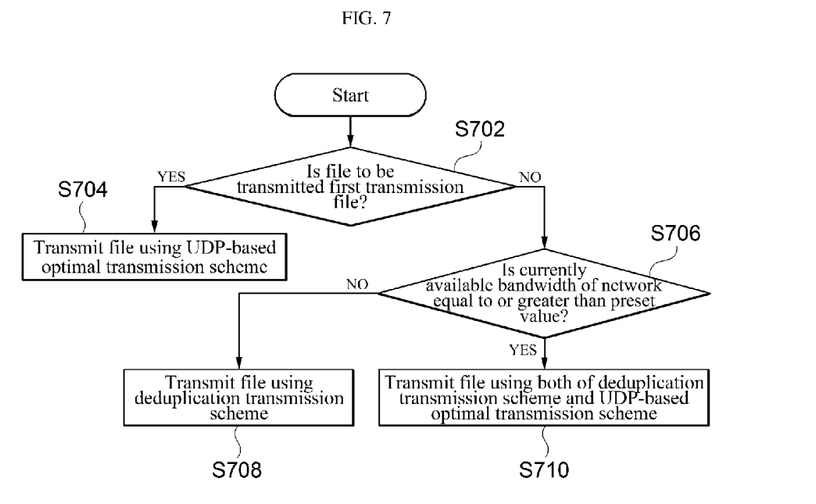
FIG. 7 is a flowchart illustrating a file transmission method according to an exemplary embodiment of the present disclosure.

FIG. 7 is a flowchart illustrating a file transmission method according to an exemplary embodiment of the present disclosure.

First, the determination unit 102 of the file transmission apparatus 100 determines whether or not the transmission target file is a first transmission file (S702). The determination unit 102 may generate the meta-information of the transmission target file, compare the generated meta-information with pre-stored meta-information, and primarily determine whether or not the transmission target file is a first transmission file. Further, the determination unit 102 may sample and hash a portion of the transmission target file to acquire the hash value, confirm whether or not the acquired hash value is pre-stored, and secondarily determine whether or not the transmission target file is a first transmission file. This will be described in detail with reference to FIG. 8.

If it is determined in step S702 that the transmission target file is a first transmission file, the transmission unit 104 of the file transmission apparatus 100 transmits the transmission target file to the file reception apparatus 106 using a UDP-based optimal transmission scheme (S704). As described above, the UDP-based optimal transmission scheme refers to a scheme for transmitting the transmission target file without reducing the transmission target file, in which the transmission target file is transmitted so that a packet transmission speed is maximized in a range in which an amount of packets to be input to the buffer of the router does not exceed the size of the buffer of the router.

If it is determined in step S702 that the transmission target file is not a first transmission file, the transmission unit 104 determines whether or not the currently available bandwidth of the network is equal to or greater than a preset value (S706).

If it is determined in step S706 that the currently available bandwidth of the network is less than the preset value (for example, a ratio of currently available bandwidth of the network to a current estimated capacity is smaller than 30%), the transmission unit 104 transmits the transmission target file to the file reception apparatus 106 using a deduplication transmission scheme (S708). As described above, the deduplication transmission scheme refers to a scheme for reducing a portion duplicated in both a transmission target file and a previously transmitted file at the time of file transmission and transmitting the resultant transmission target file. A specific method in which the transmission unit 104 transmits the file using the deduplication transmission scheme has been described above in detail, and accordingly, the description thereof will be omitted.

If it is determined in step S706, the currently available bandwidth of the network is equal to or greater than the preset value (for example, for example, the ratio of currently available bandwidth of the network to a current estimated capacity is equal to or higher than 30%), the transmission unit 104 transmits the transmission target file to the file reception apparatus 106 by applying both of the deduplication transmission scheme and the UDP-based optimal transmission scheme (S710). Accordingly, the data reduction effect of the deduplication transmission scheme and the high-speed transmission effect of the UDP-based optimal transmission scheme can be achieved simultaneously.

Figure 8:
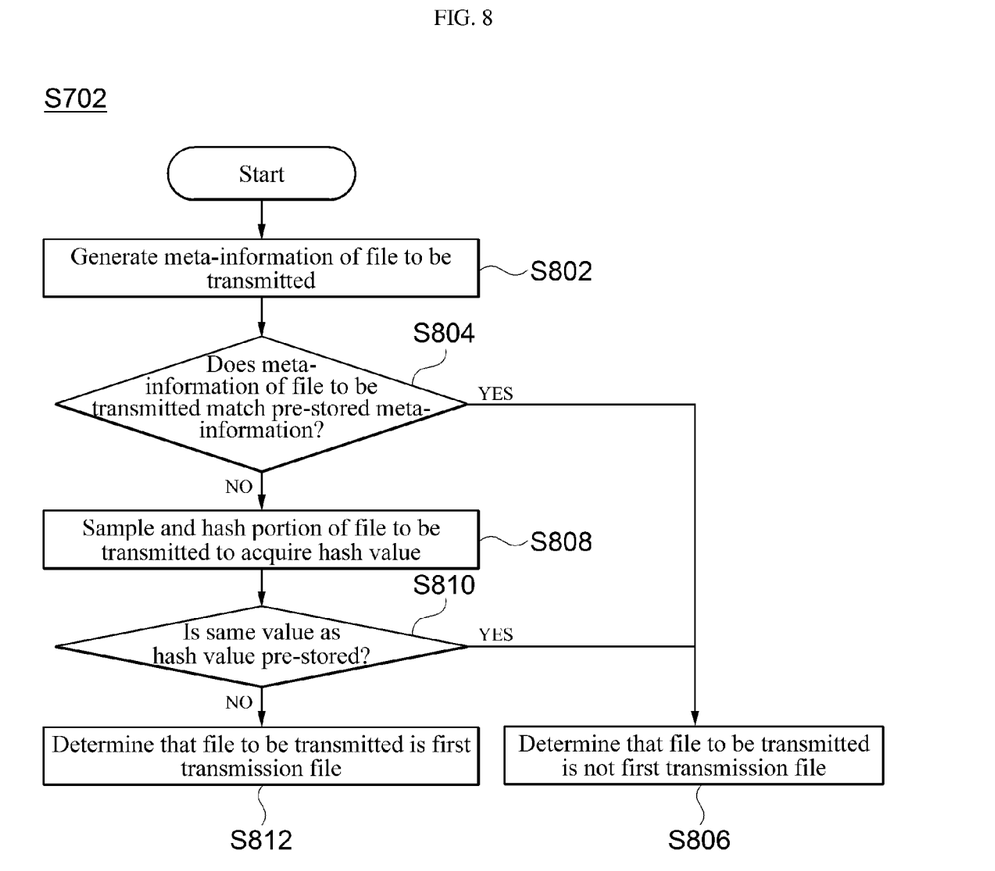
FIG. 8 is a flowchart illustrating a detailed process of a step S702 of FIG. 7

FIG. 8 is a flowchart illustrating a detailed process of step S702 in FIG. 7.

First, the determination unit 102 of the file transmission apparatus 100 generates the meta-information of the transmission target file (S802). Here, the meta-information is structured data regarding the transmission target file, and is used to determine whether or not the transmission target file is a first transmission file. The determination unit 102 may combine the name of the transmission target file with the size of the transmission target file to generate the meta-information of the transmission target file. In this case, the determination unit 102 may convert the "the name of the transmission target file+the size of the transmission target file to a character string form using a base 64 encoding scheme.

Then, the determination unit 102 compares the meta-information of the transmission target file with pre-stored meta-information to determine whether or not the meta-information thereof match (S804). For example, the determination unit 102 may compare each character included in the meta-information of the transmission target file with each character included in the presorted meta-information to determine whether or not the characters match. If the number of times that the respective characters included in the meta-information of the transmission target file match the respective characters included in the presorted meta-information exceeds a preset value, the determination unit 102 may determine that the transmission target file is not a first transmission file (S806).

Then, the determination unit 102 samples and hashes a portion of the transmission target file to acquire the hash value (S808). For example, the determination unit 102 may extract and hash a first portion 0.5%, an intermediate portion 0.5%, and a final portion 0.5% of the transmission target file. The determination unit 102 samples and hashes only a portion of the file, thereby minimizing the time taken for hashing.

Then, the determination unit 102 determines whether or not the same value as the hash value generated in step S808 is pre-stored (S810). If the same value as the hash value generated in step S808 is pre-stored, the determination unit 102 may determine that the transmission target file is not a first transmission file (S806).

If the same value as the hash value generated in step S808 is not pre-stored, the determination unit 102 may determine that the transmission target file is a first transmission file (S812).

That is, the determination unit 102 may primarily determine whether or not the transmission target file is a first transmission file based on the meta-information of the transmission target file, and secondarily determine whether or not the transmission target file is a first transmission file based on the hash value of the transmission target file. Through the two determination processes, it is possible to increase the reliability and accuracy of the determination result of the determination unit 102.

Meanwhile, the exemplary embodiments of the present disclosure may include a computer-readable recording medium including a program for performing the methods described herein on a computer. The computer-readable recording medium may include a program instruction, a local data file, a local data structure, or the like alone or in combination. The medium may be a medium particularly designed and constructed for the present disclosure or may be an available medium known to those skilled in computer software art. An example of the computer-readable recording medium may be hardware device particularly configured to store and execute program instructions, such as a magnetic medium such as a hard disk, a floppy disk, or a magnetic tape, an optical recording medium such as a CD-ROM or a DVD, a magneto-optical medium such as a floppy disc, a ROM, a RAM, or a flash memory. Examples of the program instructions may include machine code as produced by a compiler, and a high level code that can be executed by a computer using an interpreter or the like.

While the present disclosure has been described above in detail through the representative exemplary embodiments, it will be understood by those skilled in the art to which the present disclosure pertains that various modifications of the above-described exemplary embodiments can be made without departing from the scope of the present disclosure. Therefore, the scope of the present disclosure should not be limited to the described exemplary embodiments, and should be determined by not only the claims to be described below, but also their equivalents.

What is claimed is:

1. A file transmission apparatus, comprising:
   at least one hardware processor to implement:
      a determiner configured to determine whether a transmission target file is a first transmission file; and
      a transmitter configured to divide the transmission target file into a plurality of packets and transmit the plurality of packets to a file reception apparatus,
   wherein the transmitter is configured to:
      transmit the transmission target file in which a duplicate portion between the transmission target file and a previously transmitted file is reduced, when it is determined that the transmission target file is not the first transmission file, and
      transmit the transmission target file without reducing the transmission target file when it is determined that the transmission target file is the first transmission file, wherein a transmission speed of the plurality of packets is increased by increasing an amount of the plurality of packets to be input to a buffer of a router while not exceeding a size of the buffer of the router.

2. The file transmission apparatus of claim 1, wherein the determiner is configured to generate meta-information of the transmission target file, and compare the meta-information of the transmission target file with pre-stored meta-information to determine whether the transmission target file is the first transmission file.

3. The file transmission apparatus of claim 2, wherein the determiner is configured to generate the meta-information of the transmission target file based on a name and a size of the transmission target file.

4. The file transmission apparatus of claim 3, wherein the determiner is configured to respectively compare first characters included in the meta-information of the transmission target file with second characters included in the pre-stored meta-information, and determine that the transmission target file is the first transmission file when a number of matches between the first characters and the second characters is equal to or smaller than a preset value.

5. The file transmission apparatus of claim 1, wherein the determiner is configured to sample and hash a portion of the transmission target file to acquire a hash value, and determine that the transmission target file is the first transmission file based on the hash value.

6. The file transmission apparatus of claim 1, wherein when it is determined that the transmission target file is not the first transmission file, the transmitter is configured to transmit an index corresponding to the duplicate portion between the transmission target file and the previously transmitted file, instead of transmitting the duplicate portion.

7. The file transmission apparatus of claim 1, wherein when a currently available bandwidth of a network is equal to or greater than a preset value, the transmitter is configured to transmit the transmission target file in which the duplicate portion between the transmission target file and the previously transmitted file is reduced, wherein the transmission speed of the plurality of packets is increased by increasing the amount of the plurality of packets to be input to the buffer of the router while not exceeding the size of the buffer of the router.

8. A file transmission method, comprising:
   determining whether a transmission target file is a first transmission file; and
   dividing the transmission target file into a plurality of packets and transmitting the plurality of packets to a file reception apparatus,
   wherein the transmitting comprises:
      transmitting the transmission target file in which a duplicate portion between the transmission target file and a previously transmitted file is reduced, when it is determined that the transmission target file is not the first transmission file, and
      transmitting the transmission target file without reducing the transmission target file when it is determined that the transmission target file is the first transmission file, wherein a transmission speed of the plurality of packets is increased by increasing an amount of the plurality of packets to be input to a buffer of a router while not exceeding a size of the buffer of the router,
   wherein at least one of the transmitting and the dividing is performed by using at least one hardware processor.

9. The file transmission method of claim 8, wherein the determining comprises:
   generating meta-information of the transmission target file; and
   comparing the meta-information of the transmission target file with pre-stored meta-information to determine whether the transmission target file is the first transmission file.

10. The file transmission method of claim 9, wherein the generating comprises generating the meta-information of the transmission target file based on a name and a size of the transmission target file.

11. The file transmission method of claim 10, wherein the comparing comprises:
   respectively comparing first characters included in the meta-information of the transmission target file with second characters included in the pre-stored meta-information; and
   determining that the transmission target file is the first transmission file when a number of matches between the first characters and the second characters is equal to or smaller than a preset value.

12. The file transmission method of claim 8, wherein the determining comprises:
   sampling and hashing a portion of the transmission target file to acquire a hash value; and
   determining that the transmission target file is the first transmission file based on the hash value.

13. The file transmission method of claim 8, wherein the transmitting the plurality of packets comprises transmitting an index corresponding to the duplicate portion between the transmission target file and the previously transmitted file, instead of transmitting the duplicate portion, when it is determined that the transmission target file is not the first transmission file.

14. The file transmission method of claim 8, wherein the transmitting the plurality of packets comprises:
   when a currently available bandwidth of a network is equal to or greater than a preset value, transmitting the transmission target file in which the duplicate portion between the transmission target file and the previously transmitted file is reduced, wherein the transmission speed of the plurality of packets is increased by increasing the amount of the plurality of packets to be input to the buffer of the router while not exceeding the size of the buffer of the router.

15. A non-transitory computer-readable recording medium storing a computer program which, when executed by a computer, causes the computer to execute:
   determining whether a transmission target file is a first transmission file; and
   dividing the transmission target file into a plurality of packets and transmitting the plurality of packets to a file reception apparatus,
   wherein the transmitting comprises:
      transmitting the transmission target file in which a duplicate portion between the transmission target file and a previously transmitted file is reduced, when it is determined that the transmission target file is not the first transmission file; and
      transmitting the transmission target file without reducing the transmission target file when it is determined that the transmission target file is the first transmission file, wherein a transmission speed of the plurality of packets is increased by increasing an amount of the plurality of packets to be input to a buffer of a router while not exceeding a size of the buffer of the router.

* * * * *